United States Patent [19]

Escobosa

[11] Patent Number: 5,963,145
[45] Date of Patent: *Oct. 5, 1999

[54] SYSTEM FOR PROVIDING WIRELESS POINTER CONTROL

[75] Inventor: Marcus Escobosa, Anaheim, Calif.

[73] Assignee: Universal Electronics Inc., Chagrin Falls, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/605,546

[22] Filed: Feb. 26, 1996

[51] Int. Cl.$^6$ .......................... G08C 19/00; H04B 17/02; H04B 1/18; G09G 5/00
[52] U.S. Cl. ................. 340/825.72; 455/140; 455/151.1; 455/151.2; 345/169
[58] Field of Search ......................... 340/825.72, 825.69, 340/825.73, 815.78, 825.71; 455/140, 151.1, 151.2, 150.1; 345/158, 169

[56] References Cited

U.S. PATENT DOCUMENTS

| | | | |
|---|---|---|---|
| 4,796,019 | 1/1989 | Auerbach | 340/709 |
| 4,959,721 | 9/1990 | Micic et al. | 358/194.1 |
| 5,023,943 | 6/1991 | Heberle | 455/603 |
| 5,448,261 | 9/1995 | Koike et al. | 345/158 |
| 5,650,774 | 7/1997 | Drori | 340/825.32 |

*Primary Examiner*—Michael Horabik
*Assistant Examiner*—Anthony A. Asongwed
*Attorney, Agent, or Firm*—Mark R. Galis; Michael G. Kelber; Gary R. Jarosik

[57] ABSTRACT

A system for providing wireless pointer control for controlling electronic equipment, including a remote control pointer device capable of generating a signal having multiple signal components with different frequencies and a base station capable of receiving and decoding the signal having multiple signal components. The base station then interprets the multiple signal components to determine the orientation of the remote control pointer device to properly generate a pointer control signal for properly selecting a particular piece of equipment to receive remote commands or data, and where appropriate, properly displaying and positioning a cursor displayed on the electronic equipment.

7 Claims, 6 Drawing Sheets

SYSTEM FOR PROVIDING WIRELESS POINTER CONTROL

BACKGROUND OF THE INVENTION

1. Field of the Invention

The present invention relates to a system for providing wireless pointer control for controlling electronic equipment, including a remote control pointer device or hand held transmitter capable of generating a signal having multiple signal components with different frequencies and a receiver capable of receiving and decoding the signal having multiple signal components.

2. Description of the Related Art Including Information Disclosed Under 37 CFR §§ 1.97–1.99

Heretofore, various systems for providing wireless pointer control for controlling electronic equipment have been proposed. Several examples of analogous and non-analogous systems for providing wireless pointer control for controlling electronic apparatus are disclosed in the following U.S. Pat. Nos.:

| U.S. Pat. No. | Patentee |
| --- | --- |
| 4,565,999 | King et al. |
| 4,745,402 | Auerbach |
| 4,796,019 | Auerbach |
| 4,959,721 | Micic et al. |
| 5,023,943 | Heberle |
| 5,349,460 | Ogasahara et al. |
| 5,448,261 | Koike et al. |

The King et al., U.S. Pat. No. 4,565,999 discloses a cursor control system for use with a data terminal including a radiation source and an associated radiation sensor. Either the radiation source or the radiation sensor is attached to the data terminal display, while the other is directionally movable by the user. The system translates the directional motion of the user controlled radiation device to control the movement of a cursor displayed on the data terminal display.

The radiation source includes multiple LEDs. Each LED is oriented to transmit along a unique line of sight, non-parallel to the other LED's line of sight. Each LED is individually illuminated to avoid interfering with the sensing of the illumination of the other LEDs by the radiation sensor. The system then computes the directional orientation of the radiation source with respect to the radiation sensor, and appropriately positions the cursor on the terminal display.

Auerbach, U.S. Pat. Nos. 4,745,402 and 4,796,019 disclose a display system using a remote control hand unit having a "pointing function" capability for moving a cursor displayed on a display screen by changing the angular position of the remote control hand unit. The remote control hand unit includes multiple LEDs grouped in pairs of oppositely positioned LEDs. Each pair of LEDs is separately illuminated, with each LED within a pair transmitting a phase-encoded signal 180 degrees out of phase with its partner LED's signal. The resultant phase of the signal received by the receiver is indicative of the angular position of the transmitter.

The Micic et al., U.S. Pat. No. 4,959,721 discloses a remote control system including a remote control receiver and a remote control transmitter, for selecting menu items displayed on the screen of the television set. Some of the disclosed embodiments determine the selected menu field based upon the directional orientation of the remote control transmitter with respect to the screen.

The embodiments that determine the selected menu field based upon the directional orientation of the remote control makes use of an optical lens for focusing an incoming light beam and preserving the angle of entry of the incoming light. The incoming light in one embodiment is a separate light emitting diode located near the screen, while in another embodiment the incoming light is a pattern generated by the raster scan-line.

The Heberle, U.S. Pat. No. 5,023,943 discloses an electrooptical arrangement for remotely controlling an electronic apparatus with a remote control transmitter. The remote control transmitter having three sources of radiation whose radiation patterns are different from each other and can be comparatively detected relative to each other to indicate the tilting of the transmitter in different reference plane directions. A radiation detector located at the electronic apparatus to be controlled detects the different radiation intensities for the signals from the three sources to determine the tilt angle of the remote control. Two of radiation patterns from the signal sources are modified by a leaf diaphragm structure.

The Ogasahara et al., U.S. Pat. No. 5,349,460 discloses a remote control system for controlling a television receiver which uses a cursor controlled by the directional orientation of the remote control to select items in a displayed menu. The remote control determines its directional orientation by measuring the intensity of a light signal received from the device to be controlled. The light signal is received through a diaphragm having a small opening upon a group of four sensors arranged in a checkerboard pattern. The intensity of light received at each of the sensors is interpreted to determine the orientation of the remote control.

The Koike et al., U.S. Pat. No. 5,448,261 discloses a cursor control device for controlling the display position of a cursor displayed on a display device. The cursor position is controlled by the location of a remote control. The remote control has a light emitting element whose emission is detected by an imaging device including a CCD. The location of the emitted light received within the CCD array of sensors determines the position of the cursor on the screen. The cursor is controlled by the position of the remote control and not the directional orientation.

SUMMARY OF THE INVENTION

According to the present invention there is provided a system for providing wireless pointer control for controlling electronic equipment, including a hand held transmitter for transmitting a signal including position data and key data, and a receiver capable of receiving and decoding the signal. The hand held transmitter is capable of generating a signal with multiple components with different frequencies for transmitting position data.

The position data is used to provide multiple levels of positional data. At a first level the position data is used to select the particular device for receiving remote instructions or data. Items such as lamps, stereos, CD players, etc., can be selected by pointing at them. Subsequent commands can then be received and acted upon by the selected device and ignored by the non-selected devices. For example, a room could have multiple lamps or light sources that could be selectively turned on and off by pointing the hand held transmitter at the appropriate lamp and issuing an on/off command. At this level a device can be selected similar in function to transmitting a device selector command or mode key.

At a second level the position data is used by equipment with a display to provide control of a cursor displayed on the electronic equipment, related to the position and orientation of the hand held transmitter. As the hand held transmitter moves to point at different locations on the electronic equipment, the receiver tracks the movement of the hand held transmitter and correspondingly adjusts the position of the cursor on the display of the electronic equipment. In this way fields within a displayed menu can be selectively highlighted.

The position data transmitted by the hand held transmitter is generated by multiple signal generators, each signal generator transmitting one component of the aggregate signal. While transmitting position data, each signal generator transmits its signal component at a unique frequency. By each signal generator transmitting at a unique frequency, the receiver is capable of isolating the signal component originating from each signal generator.

Each signal generator is grouped with another signal generator to form a pair. The pair of signal generators are located in the same plane with the pointing axis of the hand held transmitter and are oppositely aligned off center of the pointing axis, such that the center line of the radiation pattern for each signal generator diverges from the pointing axis.

As the hand held transmitter is rotated to point at different devices or different portions of the display of electronic equipment, the center lines of the radiation patterns for the different signal generators individually move either closer or farther away from the signal sensor of the receiver. As the center line of the radiation pattern for a signal generator moves closer to the signal sensor of the receiver, the received intensity of the transmitted signal component increases. As the center line of the radiation pattern for a signal generator moves farther away from the signal sensor of the receiver, the received intensity of the transmitted signal component decreases. By monitoring and comparing the differences in intensities between the signal components generated by the grouped pairs of signal generators, the orientation of the hand held transmitter can be determined. Two pairs of signal generators are sufficient for locating the cursor at a point within the two dimensions of the display of the electronic equipment.

By transmitting each signal component over a unique frequency the signal components can be simultaneously transmitted without interfering with one another.

When the remote control pointing device transmits key data each signal generator can collectively transmit the data at the same frequency generating one strong and uniform signal.

The receiver includes a variable gain control amplifier for making adjustments based on varying operating conditions including the distance the user of the hand held transmitter is away from the receiver.

Other objects and advantages of the present application will be apparent from the detailed description and drawings which follow.

DESCRIPTION OF THE PREFERRED EMBODIMENT

Figure 1:
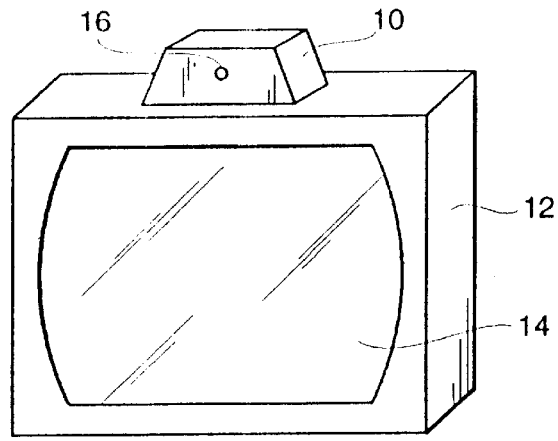
FIG. 1 is a perspective view of a receiver for generating a pointer control signal for selecting a device to be controlled and for displaying a cursor on electronic equipment, in this case a television set, connected to the receiver.

Referring now to the drawings in greater detail, describing the circuitry with reference to the control of cursor being displayed on electronic equipment, there is illustrated in FIG. 1 a perspective view of a receiver 10 for generating a pointer control signal for selecting a device to be controlled and for displaying a cursor on electronic equipment, in this case a television set 12, connected to the receiver 10. The receiver 10 is placed proximate to the screen 14 or display of the electronic equipment and has a sensor 16 for receiving a signal transmitted by a hand held transmitter 18, shown in FIG. 2.

Figure 2:
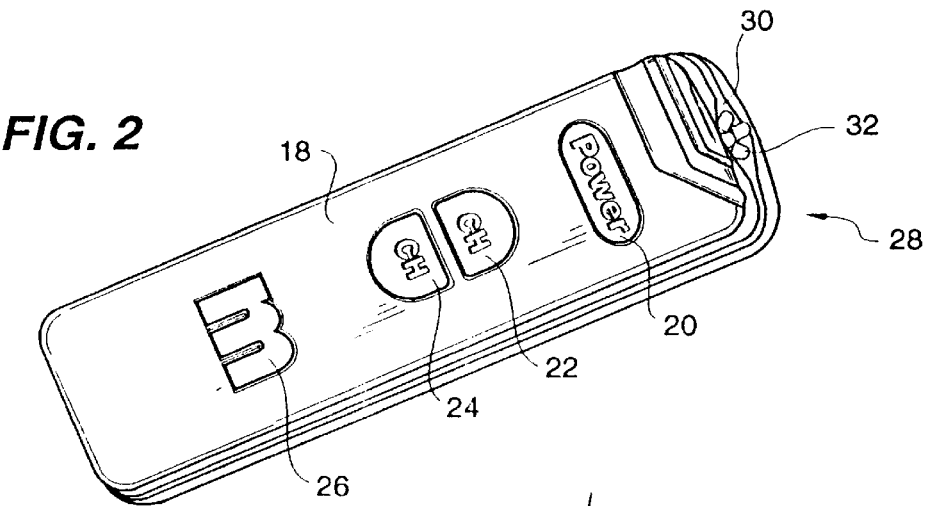
FIG. 2 is a perspective view of the hand held transmitter capable of generating position data and key data to be received by the receiver shown in FIG. 1 for remotely operating electronic equipment.

FIG. 2 illustrates a perspective view of the hand held transmitter 18 capable of generating position data and key data to be received by the receiver 10, shown in FIG. 1, for remotely operating electronic equipment. The shape of the hand held transmitter is preferably long and narrow or wand shaped in order to more clearly define a pointing axis that can be easily manipulated within the hand of the user.

The hand held transmitter 18 includes user actuatable buttons 20, 22, 24 and 26. The number of user actuatable buttons can vary significantly, however the preferred embodiment would have at least one button, so the user could minimally signal selection of device the transmitter is pointing at or the item the cursor is currently pointing to.

Toward the front 28 of the hand held transmitter 18 is located a window 30 through which a signal generating element 32 transmit wireless signal data. The preferred embodiment incorporates four infra-red light emitting diodes 34, 36, 38 and 40, shown more clearly in FIG. 3, an enlarged perspective view of the signal generating element 32.

Figure 3:
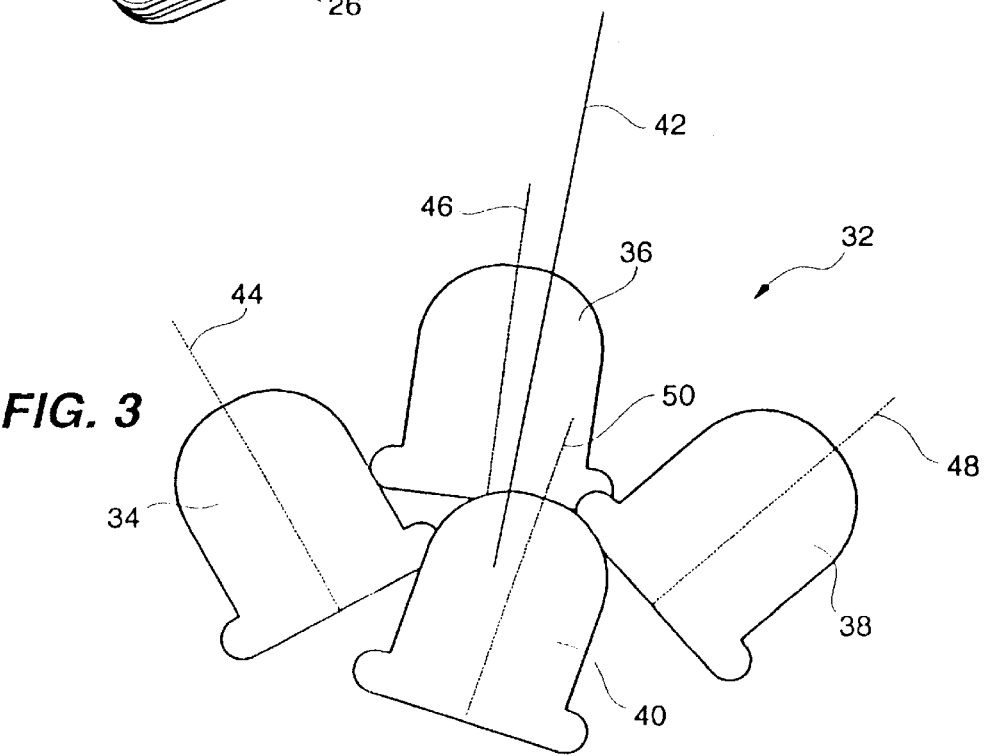
FIG. 3 is an enlarged perspective view of the multiple LED's of the hand held transmitter each oriented off center of the pointing axis of the hand held transmitter.

FIG. 3 shows the four infra-red light emitting diodes 34, 36, 38 and 40, around and pointing slightly away from the pointing axis 42 of the hand held transmitter 18. Corresponding to each of the light emitting diodes 34, 36, 38 and 40 are shown center lines 44, 46, 48 and 50. The center lines 44, 46, 48 and 50 represent the center lines of the radiation patterns that would result from the light emitting diodes 34, 36, 38 and 40 being activated.

The light emitting diodes 34, 36, 38 and 40 are grouped into pairs. Light emitting diode 34 is paired with light emitting diode 38 and light emitting diode 36 is paired with light emitting diode 40. Each diode within a grouped pair are located so as to have the center lines of their radiation pattern in the same plane with pointing axis 42 and one another. Each diode within a grouped pair are additionally located so as to have the center lines of their radiation pattern diverge from the pointing axis 42 a similar amount in opposite directions.

In the preferred embodiment one pair of light emitting diodes 36 and 40 are positioned above and below one another to allow the tracking of the orientation of the hand held transmitter 18 moving up or down. The other pair of light emitting diodes 34 and 38 are positioned to the left and the right of one another to allow the tracking of the orientation of the hand held transmitter 18 side to side.

When transmitting position data, each diode 34, 36, 38 and 40 transmits its signal component using a different frequency. The preferred embodiment transmits position data using frequencies 1500 Hz, 1700 Hz, 1900 Hz and 2100 Hz. This allows the diodes 34, 36, 38 and 40 to transmit their signal components at the same time, as one aggregate signal, and still allow the receiver to receive and decode the aggregate signal into their respective signal components for analysis.

As the hand held transmitter 18 is rotated to point at different devices or different portions of the display 14 of the electronic equipment 12, the center lines 44, 46, 48 and 50 of the radiation patterns for the different diodes 34, 36, 38 and 40 individually move either closer or farther away from the signal sensor 16 of the receiver 10. As the center line of the radiation pattern for a diode moves closer to the signal sensor 16 of the receiver 10, the received intensity of the transmitted signal component increases. As the center line of the radiation pattern for a diode moves farther away from the signal sensor 16 of the receiver 10, the received intensity of the transmitted signal component decreases.

By monitoring and comparing the differences in intensities between the signal components generated by the grouped pairs of diodes, the orientation of the hand held transmitter 18 can be determined. From the determined orientation of the hand held transmitter 18 a pointer control signal can be generated which properly selects a device or properly places a cursor on the screen 14 of the electronic equipment 12.

When one of the user actuated switches 20, 22, 24 and 26 is pressed, key data is transmitted by broadcasting the appropriate key identifying signal over all of the light emitting diodes 34, 36, 38 and 40 simultaneously. In this way a uniformly strong signal can be generated.

Figure 4:
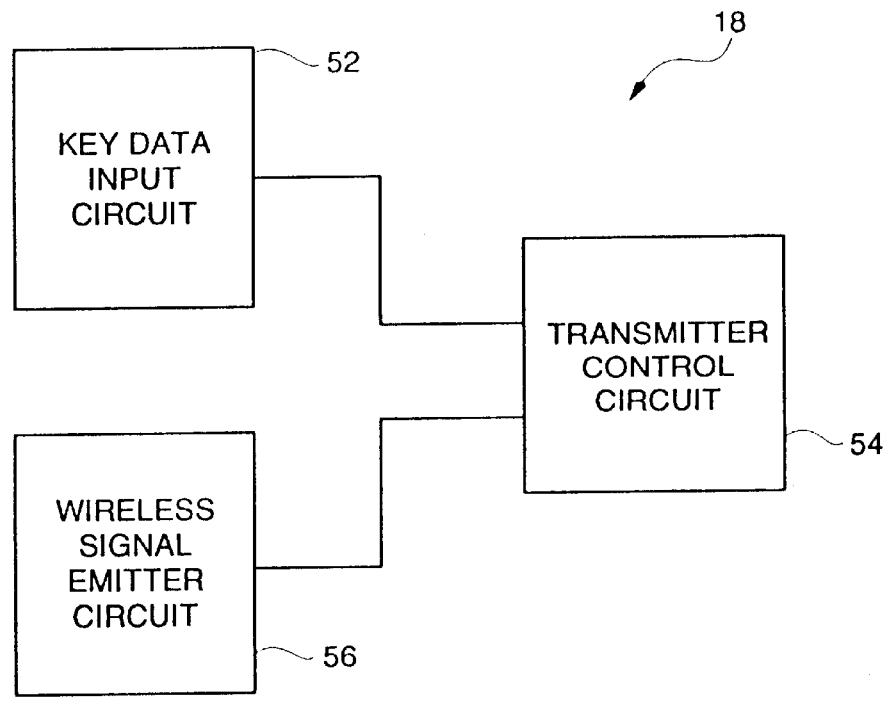
FIG. 4 is a block diagram of the internal circuitry of the hand held transmitter shown in FIG. 2.

FIG. 4 is a block diagram of the internal circuitry of the hand held transmitter 18, shown in FIG. 2. The hand held transmitter 18 includes a key data input circuit 52 coupled to a transmitter control circuit 54. The transmitter control circuit 54 is additionally coupled to the wireless signal emitter circuit 56.

Figure 5:
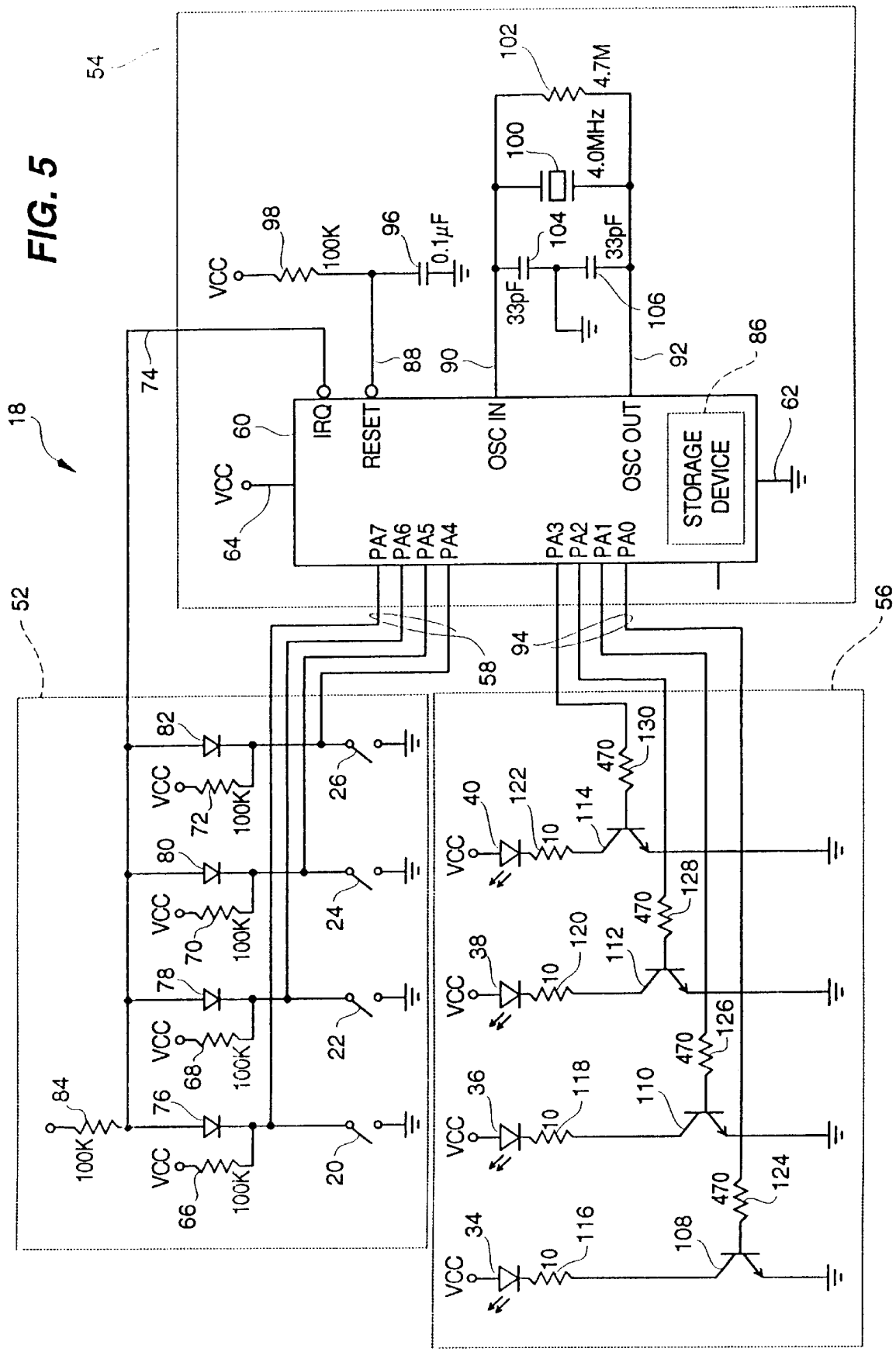
FIG. 5 is a schematic circuit diagram of the internal circuitry of the hand held transmitter shown in FIG. 2.

FIG. 5 is a more detailed electrical circuit schematic diagram of the transmitter 18, shown in FIGS. 2 and 4.

The key data input circuit 52 includes the four user actuated buttons or switches 20, 22, 24 and 26, shown in FIG. 2. Four switches have been shown for illustrative purposes only. The number of switches can vary greatly with the actual number dependant on the particular application.

While most applications will make use of at least one switch, some applications may not even require any switches. For example the wireless pointer control system could be used as a pointing aid to highlight particular information being displayed on a screen during a presentation, meeting or lecture.

Each switch 20, 22, 24 and 26 couples one of the input pins 58 of the microprocessor 60 of the transmitter control circuit 54 to ground 62. The input pins 58 of the microprocessor 60 are separately coupled to VCC 64 via pull up resistors 66, 68, 70 and 72. The pull up resistors weakly maintain a high signal on input pins 58, until one of the switches 20, 22, 24 and 26 are closed pulling the respective input pin down to ground 62.

Additionally, the input pins 58 of the microprocessor 60 are separately coupled to a common interrupt or IRQ pin 74 of the microprocessor 60 via diodes 76, 78, 80 and 82. The diodes 76, 78, 80 and 82 are oriented so that, if any of the switches 20, 22, 24 and 26 are closed pulling one of the input pins 58 to ground 62, the interrupt pin 74 will similarly be pulled low without affecting any of the other input pins 58. When the interrupt pin 74 is not being pulled low by a closed switch, the interrupt pin is weakly pulled high by resistor 84, which couples the interrupt pin 74 to VCC 64.

The transmitter control circuit 54 includes a microprocessor 60 having storage device 86 for storing program instructions and program data. The microprocessor 60 is coupled to both VCC 64 and ground 62. The microprocessor 60 includes input pins 58 and interrupt pin 74 coupling the microprocessor 60 of the transmitter control circuit 54 to the key data input circuit 52 as previously discussed. The microprocessor 60 additionally includes a reset pin 88, an oscillator in pin 90, an oscillator out pin 92, and output pins 94. The output pins 94 couple the microprocessor 60 of the transmitter control circuit 54 to the wireless signal emitter circuit 56. The storage device 86 preferably includes semiconductor memories.

The reset pin 88 is coupled to ground 62 via capacitor 96 and is coupled to VCC 64 via resistor 98. The combination of resistor 98 and capacitor 96 provides an active low reset signal for microprocessor 60 for a short duration upon power up to insure the microprocessor 60 circuitry begins in a known stable state.

The oscillator in pin 90 and the oscillator out pin 92 are coupled to one another via the parallel combination of an oscillator 100 and a resistor 102. The oscillator in pin 90 is additionally coupled to ground 62 via capacitor 104. Similarly, the oscillator out pin 92 is coupled to ground 62 via capacitor 106. The combination oscillator 100, resistor 102 and capacitors 104 and 106, produce a clocking signal used by the microprocessor 60.

The wireless signal emitter circuit 56 includes the four light emitting diode 34, 36, 38 and 40, shown in FIG. 2. The cathode of each light emitting diode 34, 36, 38 and 40 is coupled to VCC 64. The anode of each light emitting diode 34, 36, 38 and 40 is separately coupled to the collector of one of transistors 108, 110, 112 and 114, via separate resistors 116, 118, 120 and 122. The emitters of transistors 108, 110, 112 and 114 are coupled to ground 62. The base of each transistor 108, 110, 112 and 114 is separately coupled to one of the output pins 94 of the microprocessor 60 via one of resistors 124, 126, 128 and 130.

The transistors 108, 110, 112 and 114 act as switches for turning the light emitting diodes 34, 36, 38 and 40 on and off. Each light emitting diode 34, 36, 38 and 40 will intermittently transmit light dependant on the signal being generated at the output pins 94. In this way, position data and key data can be transmitted under the control of the microprocessor 60.

Figure 6:
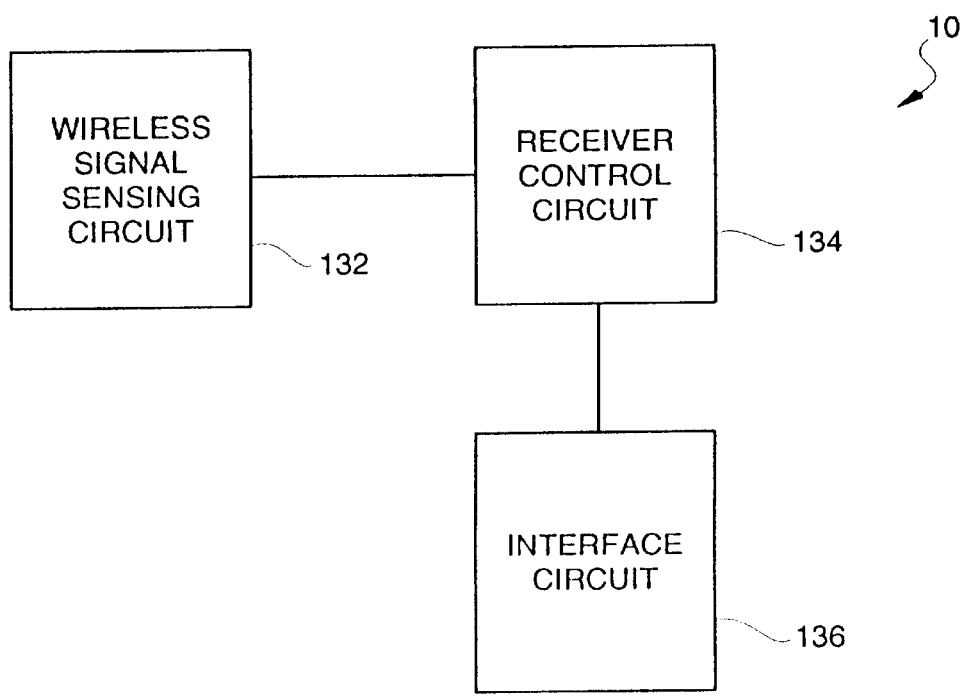
FIG. 6 is a block diagram of the internal circuitry of the receiver shown in FIG. 1.

FIG. 6 is a block diagram of the internal circuitry of the receiver 10, shown in FIG. 1. The receiver 10 includes a wireless signal sensing circuit 132 coupled to a receiver control circuit 134. The receiver control circuit 134 is additionally coupled to an interface circuit 136.

Figure 7A:
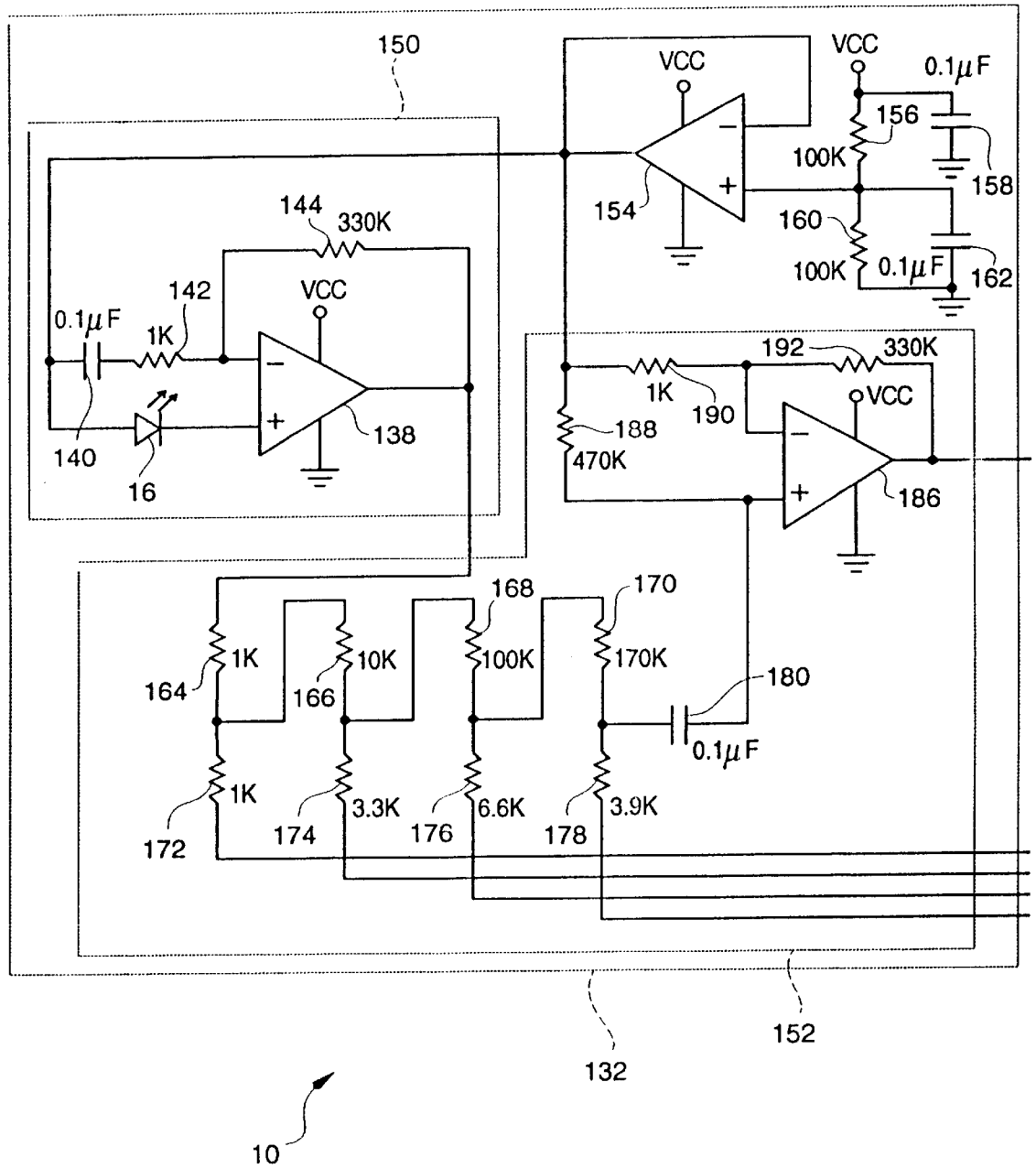
FIGS. 7A and 7B is a schematic circuit diagram of the internal circuitry of the receiver shown in FIG. 1.
Figure 7B:
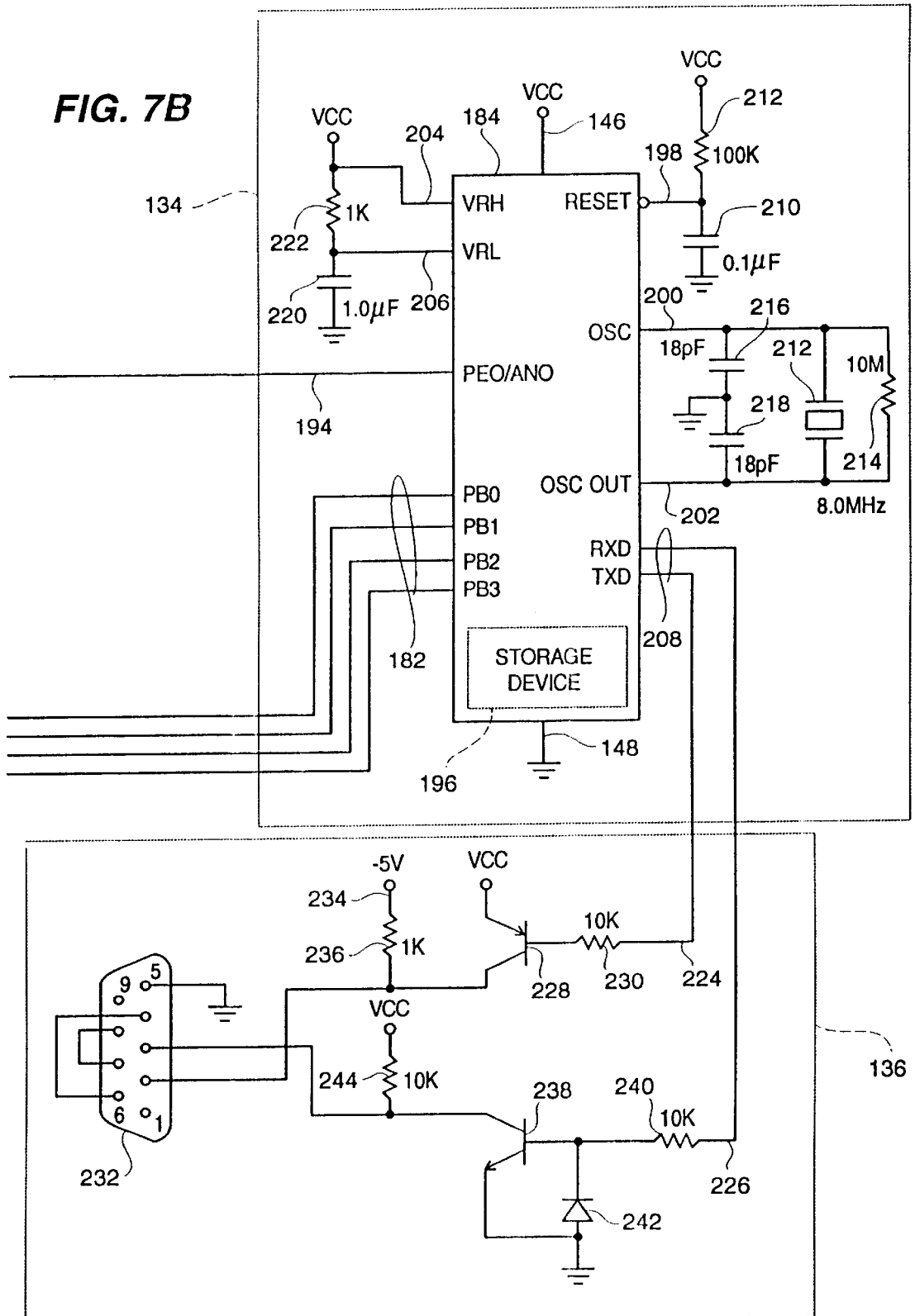

FIGS. 7A and 7B are a more detailed electrical circuit schematic diagram of the receiver 10, shown in FIGS. 1 and 6.

The wireless signal sensing circuit 132 includes a sensor or photo diode 16, also shown in FIG. 1. The photo diode 16 is preferably a wide angle photo diode. The cathode of the photo diode 16 is coupled to the positive input of an operational amplifier 138. The anode of the photo diode 16 is coupled to the negative input of the operational amplifier 138 via capacitor 140 in series with resistor 142. The negative input of the operational amplifier 138 is coupled to the output of operational amplifier via resistor 144. The operational amplifier 138 is additionally coupled to VCC 146 and ground 148.

The operational amplifier 138, capacitor 140, and resistors 142 and 144 form a fixed amplifier circuit 150 for increasing the amplitude of the signal received by the photo diode 16 and producing the necessary output impedance for driving the variable amplifier circuit 152.

The anode of the photo diode 16 is additionally coupled to the output and the negative input of operational amplifier 154. The positive input of operational amplifier 154 is coupled to VCC 146 via resistor 156. VCC 146 is coupled to ground 148 via capacitor 158. The positive input of operational amplifier 154 is coupled to ground 148 via the parallel combination of resistor 160 and capacitor 162. The operational amplifier is additionally coupled to VCC 146 and ground 148.

Operational amplifier 154 is configured as a unitary gain amplifier and outputs a reference voltage equivalent to the voltage level resulting from the voltage divider network including resistors 156 and 160. Capacitors 158 and 162 provide a degree of noise immunity in order to prevent fluctuations in the generated reference voltage.

The output of operational amplifier 138 of the fixed amplifier circuit 150 is coupled to a resistor 164 included within a resistor network including resistors 164, 166, 168, 170, 172, 174, 176 and 178. Resistors 164, 166, 168 and 170 are connected in series, coupling the output of operational amplifier 138 to DC blocking capacitor 180.

Resistor 172 couples the node between resistors 164 and 166 to one of the variable amplification control signals generated at output pins 182 of microprocessor 184 of receiver control circuit 134. Resistor 174 couples the node between resistors 166 and 168 to one of the output pins 182 of microprocessor 184. Resistor 176 couples the node between resistors 168 and 170 to one of the output pins 182 of microprocessor 184. Resistor 178 couples the node between resistor 170 and capacitor 180 to one of the output pins 182 of microprocessor 184. Each resistor 172, 174, 176 and 178 is connected to a different one of output pins 182 of microprocessor 184.

The resistor network, including resistors 164 through 178, serves as a programmable attenuator. The microprocessor 184 controls the magnitude of attenuation by pulling low or tri-stating the different signals being generated at output pins 182.

The second lead of capacitor 180, the first lead being connected to resistor 170 and 178, is connected to the positive input of operational amplifier 186. The positive input of operational amplifier 186 is additionally coupled to the output of operational amplifier 154 via resistor 188. The negative input of operational amplifier 186 is coupled to the output of operational amplifier 154 via resistor 190. The negative input of operational amplifier 186 is coupled to the output of operational amplifier 186 via resistor 192. The operational amplifier 186 is additionally coupled to both VCC 146 and ground 148. The output of operational amplifier 186 is coupled to the analog input 194 of microprocessor 184.

The receiver control circuit 134 includes the microprocessor 184 having storage device 196 for storing program instructions and program data. The storage device 196 preferably includes semi-conductor memories. The microprocessor 184 is coupled to both VCC 146 and ground 148. The microprocessor 184 includes output pins 182 and analog input pin 194 coupling the microprocessor 184 of the receiver control circuit 134 to the wireless signal sensing circuit 132 as previously discussed. The microprocessor 184 additionally includes a reset pin 198, an oscillator in pin 200, an oscillator out pin 202, a VRH input pin 204, a VRL input pin 206, and output pins 208. The output pins 208 couple the microprocessor 184 of the receiver control circuit 134 to the interface circuit 136.

The reset pin 198 of the microprocessor 184 is coupled to ground 148 via capacitor 210 and is coupled to VCC 146 via resistor 212. The combination of resistor 212 and capacitor 210 provides an active low reset signal for microprocessor 184 for a short duration upon power up to insure the microprocessor 184 circuitry begins in a known stable state.

The oscillator in pin 200 and the oscillator out pin 202 are coupled to one another via the parallel combination of an oscillator 212 and a resistor 214. The oscillator in pin 200 is additionally coupled to ground 148 via capacitor 216. Similarly, the oscillator out pin 202 is coupled to ground 148 via capacitor 218. The combination oscillator 212, resistor 214 and capacitors 216 and 218, produce a clocking signal used by the microprocessor 184.

The VRL pin 206 is coupled to ground 148 via capacitor 220 and coupled to VCC 146 via resistor 222. The VRH pin 204 is coupled directly to VCC 146. Capacitor 220 and resistor 222 help to generate a reference voltage used by the microprocessor 184 to convert analog signals to digital signals.

The interface circuit 136 is coupled to the receiver control circuit 134 via the output pins 208 of the microprocessor 184. The output pins 208 include a serial transmit line 224 and a serial receive line 226.

The serial transmit line 224 is coupled to the base of transistor 228 via resistor 230. The emitter of transistor 228 is coupled to VCC 146. The collector of transistor 228 is coupled to pin 2 of a DB9 connector 232. The collector of transistor 228 is coupled to a −5 volt reference 234 via resistor 236.

The serial receive line 226 is coupled to the base of transistor 238 via resistor 240. The base of transistor is coupled to the cathode of diode 242. The anode of diode 242 238 coupled to ground 148. The emitter of transistor 238 is coupled to ground 148. The collector of transistor 238 is coupled to pin 3 of DB9 connector 232. The collector of transistor 238 is coupled to VCC via resistor 244.

Pin 5 of the DB9 connector 232 is coupled to ground 148. Pin 4 of the DB9 connector 232 is coupled to pin 6 of the DB9 connector 232. Pin 7 of the DB9 connector 232 is coupled to pin 8 of the DB9 connector 232.

The interface circuit converts the signal levels generated by the microprocessor 184 at output pins 208 to RS232 standard signal levels and couples the signals to an output connector, in this case a DB9 connector 232.

Figure 8:
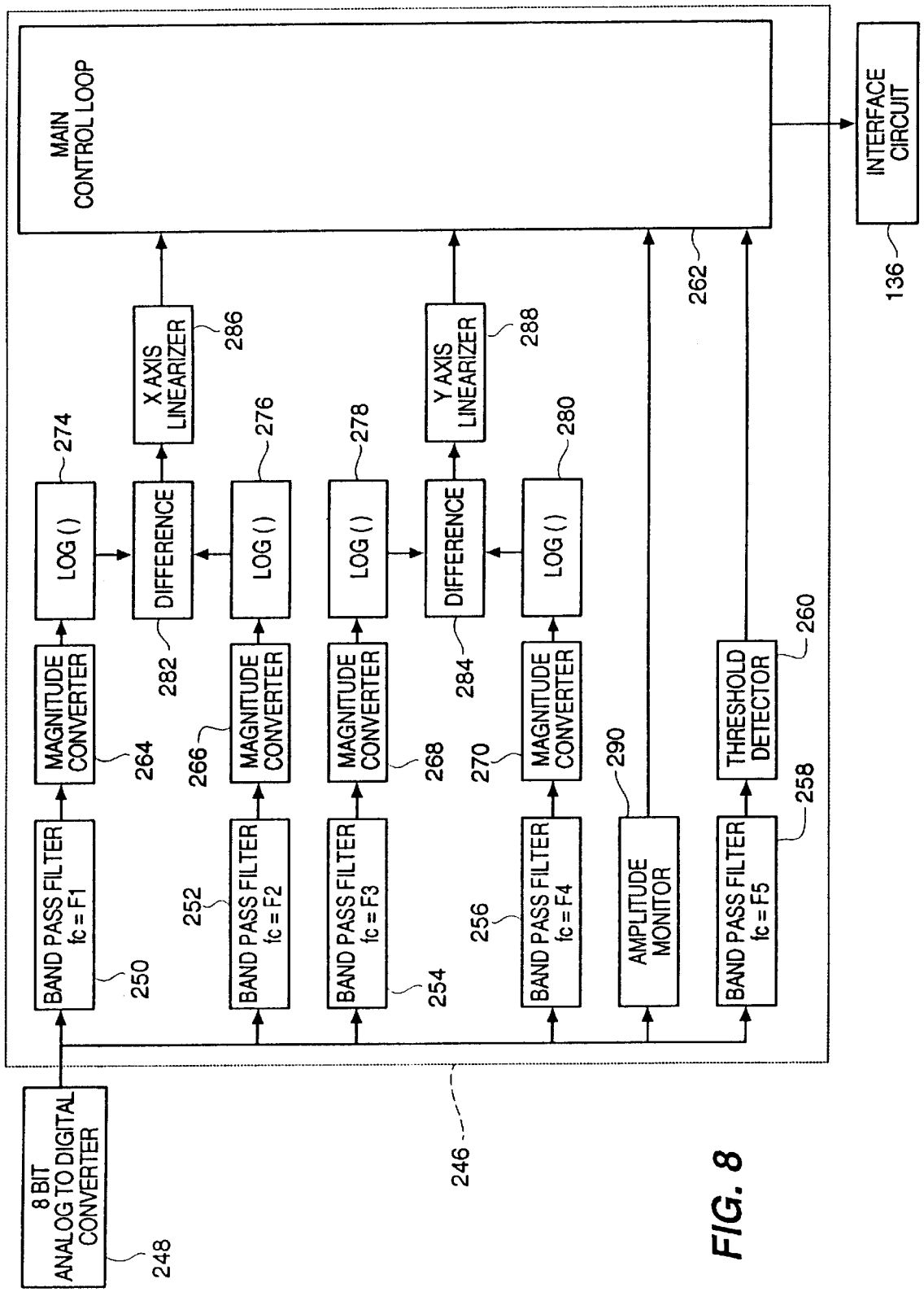
FIG. 8 is a block diagram of the digital signal processing program instruction routines being executed in the receiver.

The microprocessor 184 includes digital signal processing capabilities to assist in the processing and interpreting of the received wireless signal from the hand held transmitter 18. FIG. 8 is a block diagram of the digital signal processing program instruction routines 246 being executed in the microprocessor 184 of the receiver 10.

After the wireless signal received by the wireless signal sensing circuit 132 is amplified the signal received at the analog input pin 194 is then converted from an analog signal into a digital signal by analog to digital converter 248 of the microprocessor 184.

The digital signal is then separated and filtered into the different frequency components by five band pass filter routines 250, 252, 254, 256 and 258. The first four band pass filter routines 250, 252, 254 and 256, isolate the four frequencies used for transmitting position data. The fifth band pass filter routine 258 isolates the frequency used for transmitting key data.

The isolated frequency of the fifth band pass filter routine 258 is compared using a threshold detector routine 260 to determine if a minimum signal strength is present. The threshold detector routine 260 allows low level incidental noise having the same or similar frequency to be ignored. If the signal strength exceeds the threshold level, the signal is decoded into key data for further processing by the main control loop 262.

The isolated frequencies of the first four band pass filter routines 250, 252, 254 and 256, are each converted into a value that represents the amplitude of the received signal component by magnitude converter routines 264, 266, 268 and 270. Logarithm routines 274, 276, 278 and 280 determine the logarithmic value of the value determined by the magnitude converters 264, 266, 268 and 270. The logarithm routines 274, 276, 278 and 280 make use of a lookup table to determine the logarithmic value.

Difference routines 282 and 284 then compute the difference between the logarithmic values of the amplitudes of signal components received from each grouped pair of diodes. Using logarithmic values allows a ratio of the amplitudes to be computed by means of subtraction.

Linearizer routines 286 and 288 translate the computed signal component ratios into screen coordinates for generating a pointer control signal for selecting a device or displaying a cursor on the display 14 by the main control loop 262. The Linearizer routines 286 and 288 take into account the geometries of diodes 34, 36, 38 and 40 and the particular radiation patterns of diodes 34, 36, 38 and 40 and provides for a smooth, linear response to changes in the orientation of the hand held transmitter 18.

An amplitude monitor routine 290 monitors the overall amplitude of the signal received. Depending on the overall amplitude observed, the main control loop adjusts the degree of amplification of the variable amplifier circuit 152 of the wireless signal sensing circuit 132. The main control loop adjusts the degree of amplification by adjusting the variable amplification control signals generated at output pins 182 of microprocessor 184. In this way, adjustments to compensate for varying operating conditions can be made, including the adjustments to compensate for the distance the user of the hand held transmitter 18 is away from the receiver 10.

From the foregoing description, it will be apparent that the system for providing wireless pointer control of the present invention has a number of advantages, some of which have been described above and others of which are inherent in the invention. Also it will be understood that modifications can be made to the system for providing wireless pointer control described above without departing from the teachings of the invention.

I claim:

1. A remote control system for providing wireless pointer control for controlling electronic equipment said system comprising:

a hand held wireless transmitter having a pointing axis and comprising;

a transmitter control circuit, a key data input circuit coupled to said transmitter control circuit and having at least one user actuatable button, and a wireless signal emitter circuit coupled to said transmitter control circuit for emitting position data and key data, said circuit being capable of generating a signal for said position data comprising a plurality of signal components, each signal component being emitted along one of a plurality of axes and being transmitted at a different frequency; and a receiver comprising;

a wireless signal sensing circuit capable of receiving said signal generated by said hand held wireless transmitter, a receiver control circuit coupled to said wireless signal sensing circuit for receiving said position data and said key data, while receiving said position data, decoding said signal received by said wireless signal sensing circuit into said plurality of signal components for determining said pointing axis of said hand held wireless transmitter and generating a pointer control signal for at least one of selecting the particular electronic equipment to be controlled and positioning a cursor dependent on said pointing axis of said hand held wireless transmitter, and an interface circuit coupled to said receiver control circuit for communicating said pointer control signal to the electronic equipment.

2. The remote control system of claim 1, wherein said wireless signal emitter circuit includes a plurality of signal generating devices, each of said signal generating devices generating a radiation pattern comprising a selected frequency for producing one of said signal components.

3. The remote control system of claim 2, wherein each of said signal generating devices is positioned such that the center line of it radiation pattern diverges from said pointing axis of said hand held wireless transmitter.

4. The remote control system of claim 3, wherein said signal generating devices are grouped in pairs and each signal generating device within said pair of said signal generating devices are oriented such that the center lines of said radiation patterns diverge from said pointing axis of said hand held wireless transmitter in an opposite direction.

5. The remote control system of claim 4, wherein said pair of said signal generating devices are further oriented such that the center lines of said radiation patterns of said pair of radiation device are in the same plane as said pointing axis.

6. The remote control system of claim 5, wherein said hand held wireless transmitter includes at least two pairs of said signal generating devices, a first pair and a second pair, and wherein said plane comprising the center lines of said radiation patterns of said first pair of said signal generating devices is perpendicular to said plane comprising the center lines of said radiation patterns of said second pair of said signal generating devices.

7. A remote control system for providing wireless pointer control for controlling electronic equipment said system comprising:

a hand held wireless transmitter having a pointing axis and comprising;

a transmitter control circuit, and a wireless signal emitter circuit coupled to said transmitter control circuit for emitting position data and key data, said circuit being capable of generating a signal for said position data comprising a plurality of signal components, each signal component being emitted along one of a plurality of axes and being transmitted at a different frequency; and a receiver comprising:
a wireless signal sensing circuit capable of receiving said signal generated by said hand held wireless transmitter,
a receiver control circuit coupled to said wireless signal sensing circuit for receiving said position data and said key data, while receiving said position data, decoding said signal received by said wireless signal sensing circuit into said plurality of signal components for determining said pointing axis of said hand held wireless transmitter and generating a pointer control signal for at least one of selecting the particular electronic equipment to be controlled and positioning a cursor dependent on said pointing axis of said hand held wireless transmitter, and
an interface circuit coupled to said receiver control circuit for communicating said pointer control signal to the electronic equipment.

* * * * *